UNITED STATES PATENT OFFICE.

VINCENT TISI, OF SAN FRANCISCO, CALIFORNIA.

RAILWAY-TIE.

1,029,244.  Specification of Letters Patent.  Patented June 11, 1912.

No Drawing.  Application filed June 17, 1911. Serial No. 633,706.

*To all whom it may concern:*

Be it known that I, VINCENT TISI, a subject of the Emperor of Austria-Hungary, residing in the city and county of San Francisco and State of California, have invented new and useful Improvements in Railway-Ties, of which the following is a specification.

This invention relates to railway ties, and particularly to railway ties made of composite material.

The object of the present invention is to provide a railway tie which may be molded of a material of such nature as to produce an article of extreme toughness, inherent resiliency, durability, and which at the same time is comparatively inexpensive; and also to provide a composition whereof may be manufactured a variety of articles subjected to exposure to the elements and to great strains.

The invention consists of the parts and the construction and combination of parts, as hereinafter more fully described and claimed.

It is the desideratum to provide a composition for the manufacture of railway ties and other articles, which are subjected to the attack of the elements, and which are also subjected to great stresses and strains, and to various adaptations.

I have found by actually constructing a tie of certain components that a very substantial, durable, tough and flexible article is produced. The components I have used are in the following proportions, and consist of sand—105 parts; cement—56 parts; sawdust—5 parts; and asphaltum—28 parts, these being approximate and may be varied slightly one way or the other without materially affecting the properties of the composition. The components are handled and treated by first mixing the sand and cement thoroughly and heating the same to a temperature of approximately 400 degrees Fahrenheit, heating the asphaltum separately until somewhat plastic or fluid and adding it to, and mixing it with, the sand-cement mixture, and lastly adding the sawdust ingredients. The whole mixture then being somewhat plastic, is placed in suitable molds conforming to the article to be manufactured and therein given the desired form, and remains until sufficiently hardened to retain its shape when removed from the molds.

The mixture hereinbefore described produces an article having the desired properties which are demanded of a railway tie, and can be manufactured in large quantities at a comparatively small expense, and considering their durability, are more advantageous than ties formed of wood, and by reason of the inherent resiliency of the composition, are superior to ties formed of inelastic compositions, such as cement and other ingredients going to form concrete ties.

Having thus described my invention, what I claim and desire to secure by Letters Patent is—

A composition for the manufacture of articles, said composition including sand—approximately 105 parts; cement—approximately 56 parts; sawdust—approximately 5 parts; and asphaltum—approximately 28 parts, the several ingredients being heated and mixed together substantially as herein specified.

In testimony whereof I have hereunto set my hand in the presence of two subscribing witnesses.

VINCENT TISI.

Witnesses:
 JOHN H. HERRING,
 CHARLES EDELMAN.